US009355062B2

(12) United States Patent
Marshall et al.

(10) Patent No.: US 9,355,062 B2
(45) Date of Patent: May 31, 2016

(54) METHOD AND SYSTEM FOR EVALUATION OF FIRE SUPPRESSION SYSTEMS PERFORMANCE

(71) Applicant: UNIVERSITY OF MARYLAND, College Park, MD (US)

(72) Inventors: Andre W. Marshall, University Park, MD (US); Ning Ren, Canton, MA (US); Howard Baum, Rockville, MD (US)

(73) Assignee: University of Maryland, College Park, College Park, MD (US)

( * ) Notice: Subject to any disclaimer, the term of this patent is extended or adjusted under 35 U.S.C. 154(b) by 634 days.

(21) Appl. No.: 13/655,001

(22) Filed: Oct. 18, 2012

(65) Prior Publication Data

US 2013/0096879 A1 Apr. 18, 2013

Related U.S. Application Data

(60) Provisional application No. 61/548,530, filed on Oct. 18, 2011.

(51) Int. Cl.
*G06F 17/00* (2006.01)
*A62C 37/50* (2006.01)
(52) U.S. Cl.
CPC ............... *G06F 17/00* (2013.01); *A62C 37/50* (2013.01)
(58) Field of Classification Search
USPC ....................................................... 702/182
See application file for complete search history.

(56) References Cited

PUBLICATIONS

David Thomas Sheppard, Spray Characteristics of Fire Sprinklers, Prepared for U.S. Department of Commerce Building and Fire Research Laboratory National Institute of Standards and Technology Gaithersburg, MD 20899-8663, Jun. 2002, 206 pages.*
Sheppard; "Spray Characteristics of Fire Sprinklers"; National Institute of Standards and Technology; NIST GCR 02-838; Jun. 2002.
McGrattan, et al.; "Fire Dynamics Simulator (Version 5) Technical Reference Guide"; National Institute of Standards and Technology; NIST Special Publication 1018-5; Oct. 1, 2007.
Alpert; "Numerical Modeling of the Interaction Between Automatic Sprinkler Sprays and Fire Plumes"; Fire Safety Journal, 9 (1985), pp. 157-163.
Prahl, et al.; "Discharge Disrtribution Performance for an Axisymmetric Model of a Fire Sprinkler Head"; Fire Safety Journal, 14 (1988), pp. 101-111.
Chow, et al.; "Numerical Simulation on Cooling of the Fire-induced Air Flow by Sprinkler Water Sprays"; Fire Safety Journal 17 (1991), pp. 263-290.

(Continued)

*Primary Examiner* — Tung S Lau
(74) *Attorney, Agent, or Firm* — Rosenberg, Klein & Lee

(57) ABSTRACT

An initial (near-field) spray generated by a sprinkler under study is fully characterized using a laser-supported Shadowgraphy/PTV system. Near-field spray characteristics are established from local measurements, which are mapped in a spherical coordinate system consistent with the kinematics of the spray. A novel data compression scheme is introduced to generate analytical functions describing the sprinkler spray based on the measurements. These analytical functions are useful for initiating the sprinkler spray in computational fluid dynamics (CFD) based spray dispersion and fire suppression modeling. The near-field spray measurements and associated data compression approach are validated by comparing volume density measurements 1 meter below the sprinkler with volume density predictions generated from spray dispersion calculations initiated with the analytical spray functions.

14 Claims, 6 Drawing Sheets

(56) References Cited

PUBLICATIONS

Bill, Jr.; "Numerical Simulation of Actual Delivered Density (ADD) Measurements"; Fire Safety Journal 20 (1993), pp. 227-240.

Nam; "Numerical simulaton of the penetration capabilty of sprinkler sprays"; Fire Safety Journal 32, No. 4 (1999), pp. 307-329.

Widmann; "Phase Doppler interferometry measurements in water sprays produced by residential fire sprinklers"; Fire Safety Journal 36, No. 6 (2001), pp. 545-567.

\* cited by examiner

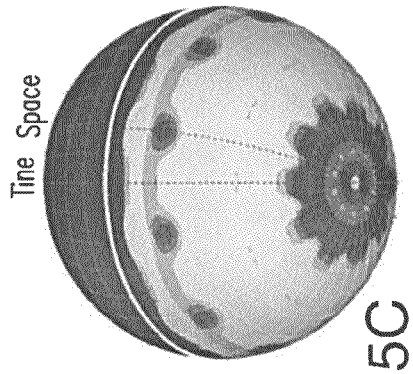
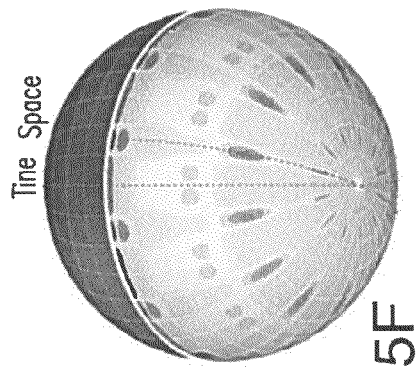
FIG. 5A  FIG. 5B  FIG. 5C
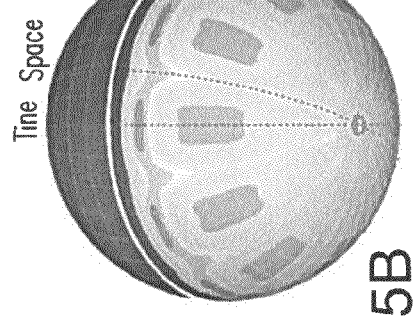
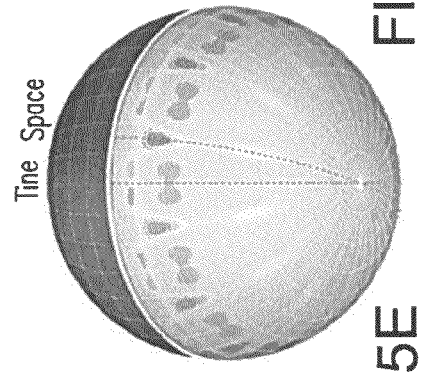
FIG. 5D  FIG. 5E  FIG. 5F

METHOD AND SYSTEM FOR EVALUATION OF FIRE SUPPRESSION SYSTEMS PERFORMANCE

STATEMENT REGARDING FEDERALLY SPONSORED RESEARCH OR DEVELOPMENT

The development of the invention described herein was funded by NSF under grant No. CBET0645063. The U.S. Government has certain rights in this invention.

REFERENCE TO THE RELATED APPLICATIONS

This Utility patent application is based on the Provisional Patent Application No. 61/548,530 filed on 18 Oct. 2011.

FIELD OF THE INVENTION

The present invention relates to fire suppression systems, and in particular, to evaluation of fire suppression systems performance.

More in particular, the present invention relates to an advanced software-supported methodology for evaluating fire suppression systems performance as a part of fire suppression systems design tool promising unprecedented accuracy and ease of use.

Further, the invention relates to fire suppression systems performance evaluation which is based on laser measurements of sprinkler spray characteristics and data compression approaches applied to the measured spray characteristics to create a model/representation of the spray suited for modeling the spray in computer simulations.

Further, the present invention relates to fire suppression systems design tools which generate compact basis functions based on measured sprinkler's spray characteristics to create a product (sprinkler) database which may be incorporated into a fire suppression system design software for a designer's use.

The present invention additionally relates to a computer system configured to facilitate post-processing of drop measurements required to characterize dispersion of a sprinkle spray in terms of basis functions to develop a product database which may be incorporated into a game-engine to develop fire suppression systems design software for interactive real-time graphics based design and performance evaluation.

BACKGROUND OF THE INVENTION

Sprinklers are widely used in fire suppression applications. The function of the sprinkler is to prevent fire growth by effectively dispersing water (or other liquid, or foam) over a wide area within the fire environment area. This dispersion is achieved by breaking a continuous stream of liquid into a spray of discrete drops with wide range of sizes and velocities.

While fire suppression sprays control the fire through a number of mechanisms which include wetting, cooling, blowing, oxygen depletion, and radiation attenuation, the primary suppression mechanism provided by sprinklers is wetting.

The suppression performance of the sprays produced by sprinklers is determined by their ability to penetrate the fire to reach burning surfaces, while dispersing water (or other appropriate liquid) throughout the heated fire environment area. Spray penetration and dispersion are governed by the initial spray characteristics (initial drop size, and velocity characteristics of the spray) and their interaction with the fire.

Sprays with large drops readily penetrate the fire plume to wet combustible materials and control fire growth. However, these sprays require a high volumetric flow rate for effective dispersion.

Alternatively, sprays with small drops effectively use their volume to generate a large number of drops facilitating dispersion. These small drops also have a high surface to volume ratio for rapid evaporation, reducing fire gas temperatures and associated heat feedback to fuel surfaces. However, small drops easily lose their initial momentum making it difficult to penetrate the fire plume.

Optimizing the drop size for fire plume penetration and dispersion is critical for fire suppression performance.

Traditionally, sprinkler performance has been evaluated through testing. However, with the advent of the Fire Dynamics Simulator (FDS) first released in 2000 [K. McGrattan, et al., Fire Dynamics Simulator (Version 5), Technical Reference Guide, NIST Special Publication 1018-5, 2008], modeling of fire phenomena with computational fluid dynamics (CFD) tools is becoming increasingly popular.

Some early computational studies [R. L. Alpert, Fire Safety J., 9 (1), 1985, 157-163; W. K. Chow, et al., Fire Safety, J., 17, 1991, 263-290; S. Nam, Fire Safety J., 26 (1), 1996, 1-34; S. Nam, Fire Safety J., 32 (4), 1999, 307-330; S. Nam, Atomization and Sprays, 4, 1994, 385-404; and L. A. Jackman, "*Sprinkler Spray Interaction with Fire Gases,*" PhD thesis, South Bank University, London, UK, 1992] are focused on studying the interaction between fire plumes and sprinkler sprays. However, these early computational studies did not provide detailed knowledge of initial spray characteristics, dispersion predictions (typically quantified through analysis of volume flux to the floor), and they were not sufficient in producing accurate and quantifiable results as to sprinkler performance.

Early spray characterization focused on far-field measurements are presented in P. H. Dundas, "The Scaling of Sprinkler Discharge: Prediction of Drop Size," Report No. 10, Factory Mutual Research Corporation, 1974; G. Heskestad, "Proposal for Studying Interaction of Water Sprays with Plume in Sprinkler Optimization Program," Factory Mutual Research Corporation, 1972; and H. Z. Yu, "Investigation of Spray Patterns of Selected Sprinklers with the FMRC Drop Size Measuring System," First International Symposium on Fire Safety Science, New York, p. 1165-1176.

Most of these studies are focused on volume flux distribution and drop size measurements. Volume flux distribution is a major criterion for sprinkler evaluation, since it shows the ability of a sprinkler to effectively disperse water over the protected area. Volume flux usually has a very high peak directly below the sprinkler, and decreases dramatically when moving radially outwards. Despite this high peak, only a small portion of the overall flow is contained in this centerline area making it relatively unimportant to sprinkler performance.

Drop size characterization measurements primarily focused on quantifying the volume median diameter, $d_{v50}$, were obtained from drop size distributions in sprinkler sprays. P. H. Dundas in ["The Scaling of Sprinkler Discharge: Prediction of Drop Size," Report No. 10, Factory Mutual Research Corporation, 1974] used a high-speed photographic and laser shadowing techniques to measure drop size distributions from six sprinklers with nozzle diameters ranging from 3.1-25.4 mm and with pressures ranging from 0.345-5.25 bar.

Dundas's research confirmed the correlation first proposed by G. Heskestad in ["Proposal for Studying Interaction of Water Sprays with Plume in Sprinkler Optimization Program," Factory Mutual Research Corporation, 1972] that $$d_{v50}/D_0 = CWe^{-1/3}, \tag{Eq. 1}$$

where $D_0$ is the orifice diameter, C is a constant depending on the sprinkler geometry, and We is Weber Number defined as $We = \rho U^2/\sigma$, where $\rho$ is the density of the fluid, U is the velocity of the fluid, and $\sigma$ is the surface tension.

Dundas summarized the C value from different researchers showing values in the range $1.74 < C < 3.21$.

Detailed sprinkler measurements have also been reported by H. Z. Yu in ["Investigation of Spray Patterns of Selected Sprinklers with the FMRC Drop Size Measuring System," First International Symposium on Fire Safety Science, New York, pp. 1165-1176], J. M. Prahl, et al., in [Fire Safety J. 14 (1988) 101-111], J. F. Widmann in [Fire Safety J. 36 (2001) 545-567], and D. T. Sheppard in [Spray Characteristic of Fire Sprinkler, NIST GCR 02-838, 2002]. They also verified that drop size could be reasonably correlated with $We^{-1/3}$. However, the respective coefficients vary with sprinkler configuration.

The overall measured drop size was used to generate sprinkler sprays in early spray dispersion modeling studies. Notable work on sprinkler spray modeling has been conducted by R. L. Alpert and presented in [R. L. Alpert, Fire Safety J., 9 (1) (1985) 157-163]. Further improvements were performed by Bill [R. G. Bill, Fire Safety J. 20 (1993) 227-240] and Nam [S. Nam, Fire Safety J., 26 (1) (1996) 1-34]. In their study, the sprinkler spray was introduced by assigning the measured drop size, volume flow rate, discharge speed and discharge angle of 275 trajectories. The trajectories were adjusted manually so that the predicted volume density on the floor would match the experiments.

Similar ideas have been incorporated into CFD (Computational Fluid Dynamics) tools where the user can map out the initial spray by specifying the local velocity and flux fraction details for arbitrary solid angles. However, tabulating these values for the entire sprinkler spray is computationally prohibitive. Furthermore, the ability to include local drop size information at a given solid angle is required to completely characterize the spray.

A comprehensive methodology for characterizing sprinkler sprays in effective and accurate fashion, free of shortcoming of the early studies is a long-lasting need for fire suppression systems.

SUMMARY OF THE INVENTION

An object of the present invention to provide a technique supporting detailed measurements conducted near the sprinkler discharge (i.e. the near-field) to characterize the initial sprinkler spray.

It is another object of the present invention to provide a comprehensive framework for representing detailed near-field measurements of the sprinkler spray in a compact format for spray analysis and modeling. This framework is facilitated by establishing a high-fidelity spray initiation database (at least for the most popular sprinkler models) useful for widespread and consistent sprinkler dispersion and fire suppression performance analysis.

It is a further object of the present invention to provide a method and system which use a combination of innovative (1) laser based measurements that require only a limited number of measurements at selected assessment stations; (2) analytical methods, supported by a basis function data compression approach to create a product database; (3) software approaches which incorporate the product database in order to minimize required user information; and (4) engineering practices to create a fire suppression design tool with unprecedented accuracy and ease of use. A game-engine tangible medium is contemplated for interactive real-time graphics based design and performance evaluation.

It has been determined that laser-supported Shadowgraphy/PTV (Particle Tracking Velocimetry) measurement techniques are well suited for studying of sprinkler sprays. Only a limited number of measurements are required at select assessment stations to characterize the sprinkler when used with a basis function data compression approach.

The basis functions provide a compact physics based representation of the spray that is well suited for initializing the spray in computer simulations. These compact basis functions may be generated for specific fire suppression devices in order to create a product database. The product database may be incorporated into the fire suppression system design software in order that a user/designer needs only a device name to design the fire suppression device.

A measurement analysis software package has been developed to facilitate post-processing of the millions of drop measurements required to characterize the spray in terms of these basis functions. This software (and associated measurements) are essential to the development of the product database. It was discovered that a simple reduced physics droplet tracking method accounting for drag forces is able to accurately predict the dispersion of the fire suppression spray (after initiation described with basis functions and product database) greatly reducing the computational requirements for spray dispersion analysis. This reduced physics modeling approach can be incorporated into a game engine to develop fire suppression system design software for interactive real-time graphics based design and evaluation. Using the interactive design software, the suppression system may be evaluated based on the volume flux of water under quiescent conditions consistent with regulatory code requirements (NFPA13) and fire protection engineering practices.

In one aspect, the present invention constitutes a method for evaluating a fire suppression system performance, which includes the steps of:

measuring near-field spray characteristics of an initial spray generated by a sprinkler under study. Preferably, the spray characteristics are being measured at various operating conditions and different geometries of the sprinkler deflector;

entering the measured characteristics of the initial spray in a computer system configured to process these characteristics in accordance to a measurement analysis algorithm. The computer system applies compact basis functions to the measured characteristics of the initial spray to generate a product database based on the measured characteristics of the near-field spray.

In the measurement step, laser-supported Shadowgraphy/PTV (Particle Tracking Velocimetry) measurements techniques are used, where a pulsed laser beam is directed onto the initial spray, and a digital camera is focused on the initial spray. The pulsed laser and the digital camera actuation are synchronized to acquire double images of drops in the initial spray separated by a predetermined image separation time interval.

A spatial calibration and image processing are applied to the double images of drops to result in drops' sizes in each double image, and drops' velocities are acquired through comparison of drops' trajectories obtained from the double images and the image separation time interval.

During the measurement step, the sprinkler is traversed and rotated to form an extended spherical interrogation region covering multiple imaging areas, each azimuthally aligned with the geometry features of the sprinkler deflector. The individual images and the multiple imaging areas are subsequently combined for further processing.

Among the measurement characteristics of the initial spray are radial volume density distributions which are used in further calculations to obtain a maximum density radial location R of the initial spray as $$R = U(2h/g)^{1/2}, \quad \text{(Eq. 2)}$$

where h is the measurement elevation below a nozzle of the sprinkler, g is a gravitational constant, and U is the maximum initial spray velocity, and a linear density of a dispersed volume flow q' as $$q' = \frac{q''}{Q/\pi R^2}(2r'), \quad \text{(Eq. 3)}$$

where q" is the area volume density, and Q is the nozzle flow rate.

In calculations, the initial spray is specified by a number of individual drops determined from stochastic distributions based on the measured characteristics. The specified number of drops is generated on a surface of a sphere originated from a center of the sprinkler deflector with a radius equal to an initiation distance for complete spray formation. Further, an azimuthal angle ψ, elevation angle θ, dimensionless drop size d, and dimensionless drop velocity V are assigned to each of specified number of individual drops, and the initial spray is described in terms of the volume probability density as $$\int_\theta \int_\psi \int_u \int_d f_V(\theta,\psi,u,d) d\theta \cdot d\psi \cdot du \cdot dd = 1, \quad \text{(Eq. 4)}$$

where the azimuthal angle ψ is determined by randomly choosing an outcome space ranging from 0 to 1, and selected according to the cumulative distribution function $$F_V(\psi') = \int_0^{\psi'} f_V(\psi) d\psi, \quad \text{(Eq. 5)}$$

where $f_V(\psi)$ represents the volume probability density for ψ integrated over elevations angles θ, drops sized, and drops velocities in $$f_V(\psi) = \int_\theta \int_u \int_d f_V(\theta,\psi,u,d) d\theta \cdot du \cdot dd. \quad \text{(Eq. 6)}$$

Further, the elevation angle θ is specified through random selection from the outcome space ranging between 0 and 1 of the conditional probability cumulative distribution function $$F_V(\theta/\psi') = \int_0^\theta f_V(\dot\theta/\psi') d\dot\theta \quad \text{(Eq. 7)}$$

where (θ/ψ') represents the conditional volume probability density of θ at a specific azimuthal area ψ' given by $$f_V(\theta|\psi') = \frac{\int_u \int_d f_V(\theta, \psi', u, d) du \cdot dd}{\int_\theta \int_u \int_d f_V(\theta, \psi', u, d) d\theta \cdot du \cdot dd}. \quad \text{(Eq. 8)}$$

The algorithm further calculates a local drop size distribution as:

$$F_V(d|\theta',\psi') = \text{CVF}(d) = \int_0^d f_V(\dot d|\theta',\psi') d\dot d \quad \text{(Eq. 9)}$$

where CFF(d) is a Cumulative Volume Fraction.

Subsequently, a local drop velocity is calculated as:

$$F_V(u|\theta',\psi',d') = \int_0^u f_V(\dot u|\theta',\psi',d') d\dot u \quad \text{(Eq. 10)}$$

As a part of the measuring process, the azimuthally variable characteristics of the initial spray are measured, and the system applies Fourier series to the measured azimuthally variable characteristics to calculate a continuous interpolation function between the characteristics measured for adjacent spaces and tines of the sprinkler deflector, as:

$$F_V(\psi) = A(\psi) F_V(\psi_{Tine}) + (1 - A(\psi)) F_V(\psi_{Space}) \quad \text{(Eq. 11)}$$

and $$A(\psi) = \frac{a_0}{2} + \sum_{n=1}^\infty a_n \cos\frac{n\pi}{T/2}\psi \quad \text{(Eq. 12)}$$

where T is the angle sum of an individual tine and individual space, $\alpha_o$ and $\alpha_n$ are Fourier coefficients for a square wave determined from the deflector geometry calculated for a first tine as:

$$a_n = \frac{2}{T}\int_{-T_{tine}/2}^{T_{tine}/2} \cos\frac{n\pi}{T/2}\psi d\psi. \quad \text{(Eq. 13)}$$

The system further determines the elevation angle locations of random drops in the initial spray as:

$$f_V(\theta|\psi') = \frac{f_0}{\sqrt{2\pi}\,\sigma}\exp\left(\frac{(\theta-\theta_0)^2}{2\sigma^2}\right) + \sum_{n=0}^\infty C_n(\theta)P_n(\cos(\theta)), \quad \text{(Eq. 14)}$$

where $f_o$ is a magnitude of the local volume flux peak, $\theta_o$ is an elevation angle location of the local volume flux peak, σ characterizes a width of the local volume flux peak, and $P_n$ are the Legendre polynomial coefficients determined from the measurements.

The compact basis functions are generated which describe the local characteristic drop size, $d_{v50}$, and distribution width parameter, γ, as $$f(d_{v50}|\theta',\psi') = \sum_{n=0}^\infty C_n(d_{v50})P_n(\cos(\theta')), \quad \text{(Eq. 15)}$$

and $$f(\gamma|\theta',\psi') = \sum_{n=0}^\infty C_n(\gamma)P_n(\cos(\theta')). \quad \text{(Eq. 16)}$$

wherein local drop size distributions are generated from the $d_{v50}$ and $\gamma$ by applying a combined Log-Norman-Rosin-Ramnler function:

$$CVF(d) = \qquad\qquad\text{(Eq. 17)}$$
$$\begin{cases} \dfrac{1}{\sqrt{2\pi}}\int_0^d \dfrac{\gamma/1.15}{\dot{d}}\exp\!\left(-\dfrac{(\ln(d/d_{v50}))^2}{2(1.15/\gamma)^2}\right)d\dot{d} & (d<d_{v50}) \\ 1-\exp(-0.693(d/d_{v50})^\gamma) & (d>d_{v50}) \end{cases}.$$

Volume flux distributions, drops' size distributions, and drops' velocity distributions are measured in the initial spray which are azimuthally correlated with geometric features of the sprinkler deflector. Subsequently, the spray configuration is transformed into a compact description through the steps of:

generating analytical functions describing spatial variation of the drops' density, size, and velocity in correspondence to an elevation angle, wherein the analytical functions include Legendre polynomials, Gaussian functions, and Fourier series.

Each analytical function is defined through respective coefficients determined by processing the measured spray characteristics. The respective coefficients provide average values and profile shapes for the measured spray characteristics for the Legendre polynomials and Gaussian functions. The respective coefficients are determined from the sprinkler's nozzle geometry for the Fourier series.

The dispersion of the sprinkler spray is characterized in terms of the basis functions to create a product database which may be incorporated into fire suppression design software for further use by a designer.

In another aspect, the present invention constitutes a system for evaluation of a fire suppression system performance. The system comprises:

a measuring sub-system for obtaining measurement data characterizing an initial spray of a sprinkler under study;

a computer system operatively coupled to the measurement system, and configured to process the measurement data, a data compression unit operatively coupled to the computer system and configured to generate compact functions describing the sprinkler spray based on the measurement data, and a spray modeling unit operatively coupled to the data compression unit and configured to characterize the spray in terms of the compact functions and to create a product database for the sprinkler under study.

In the overall system, the measuring sub-system is based on laser-supported Shadowgraphy and Particle Tracking Velocimetry (PTV) measurement techniques.

A mapping unit is operatively coupled to the measurement sub-system and is configured to map near-field spray characteristics in a spherical coordinate system consistent with the kinematics of the initial spray.

These and other features advantages of the present invention will be apparent from the following detailed description taken in conjunction with accompanying patent Drawings.

BRIEF DESCRIPTION OF THE DRAWINGS

FIGS. 5A-5F depict spherical contour maps for Tyco ESFR sprinkler at 1.4 bar (FIGS. 5A-5C); Tyco D3 sprinkler at 2.8 bar (FIGS. 5D-5E); Flux normalized by average flux (FIGS. 5A, 5D); Local $d_{v50}$ normalized by overall $d_{v50}$ (FIGS. 5B, 5E); and Local $\gamma$ (FIGS. 5C, 5F)

DETAILED DESCRIPTION OF THE PREFERRED EMBODIMENT

The fire suppression performance of the sprays generated from sprinklers is determined by their ability to penetrate the fire to reach burning surfaces below, while dispersing water throughout the heated fire environment area. Spray penetration and dispersion are governed by the initial drop size and velocity characteristics of the spray, which depend on the injection conditions and sprinkler configuration.

In the subject invention, the initial spray is fully characterized using a laser-based Shadowgraphy and Particle Tracking Velocimetry (PTV) system producing nearly a million simultaneous drop size/velocity realizations for each sprinkler spray. Near-field spray characteristics are established from local measurements, which are mapped in spherical coordinate system consistent with the kinematics of the spray.

A novel data compression scheme is introduced which generates analytical functions describing the sprinkler spray based on the measurement data. These analytical functions are useful for initiating the sprinkler spray in computational fluid dynamics (CFD) based spray dispersion and fire suppression modeling. The framework of the present invention reveals physical characteristics of the initial spray not easily recognized from raw data.

The near-field spray measurements and associated data compression approach are validated by comparing volume density measurements below the sprinkler with volume density predictions generated from spray dispersion calculations initiated with the analytical spray functions.

In the present invention, detailed measurements have been conducted near the sprinkler discharge, i.e., the near field measurements, to characterize the initial sprinkler spray. The comprehensive framework presents detailed measurements in a compact format for spray analysis and modeling. This framework provides the opportunity to establish a high fidelity spray initiation database, at least of the most popular sprinkler models, useful for widespread and consistent sprinkler dispersion and fire suppression analysis.

Figure 1:
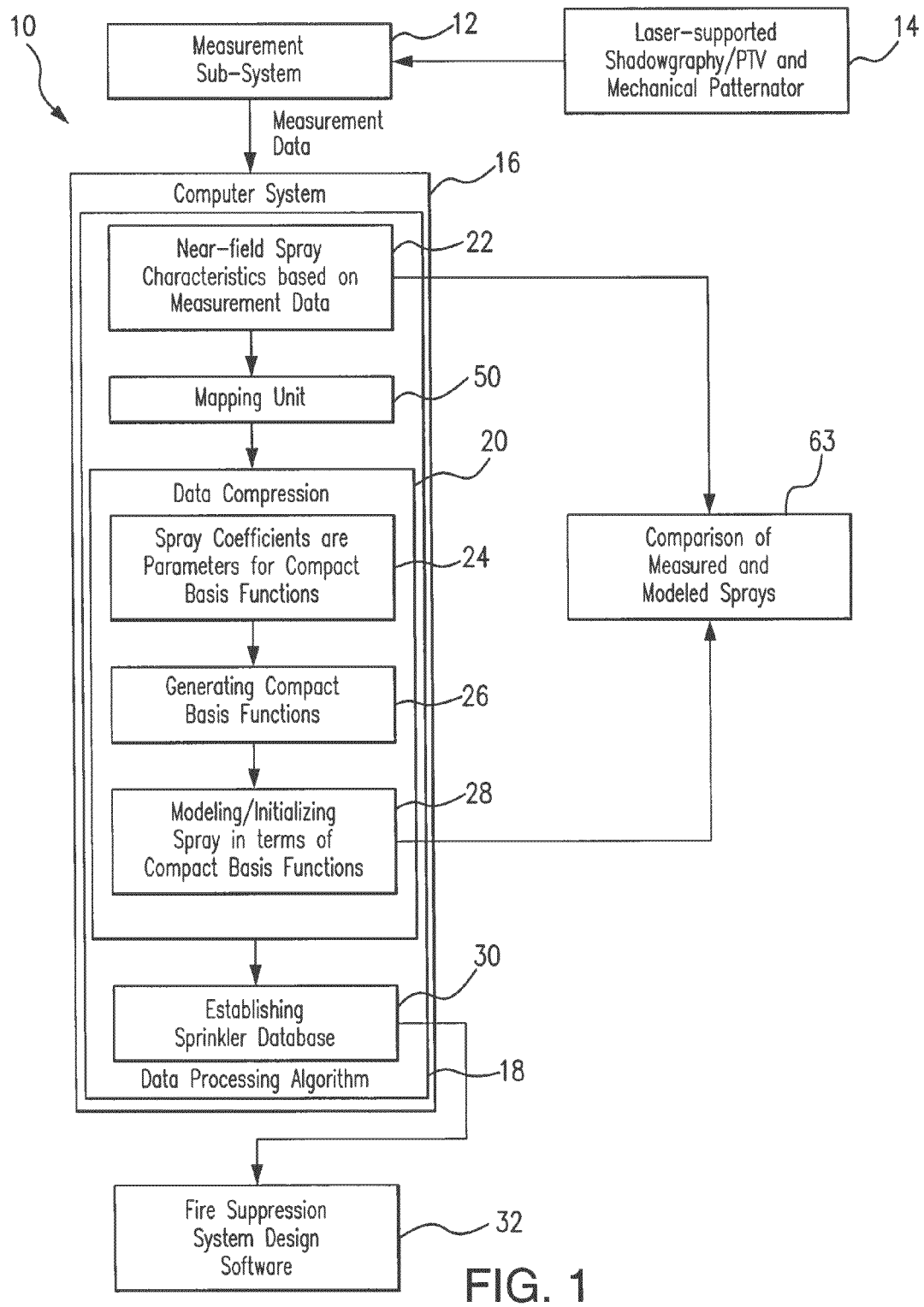
FIG. 1 is a schematic representation of the system of the present invention.

Referring to FIG. 1, which depicts, in a schematic functional format, the system 10 of the present invention, a measurement sub-system 12 measures characteristics of the spray of the sprinkler under study using a laser-supported Shadowgraphy and Particle Tracking Velocimetry (PTV) methodologies schematically presented as block 14. These techniques are well known to those skilled in the art, and principles of operation of the techniques will not be detailed herein. With the help of the measuring sub-system 12, measurement data are obtained which characterize an initial spray, i.e. near field, of a sprinkler under study.

The measured data is supplied to a computer system 16 which processes the measured data in accordance with an algorithm 18 designed specifically for the purposes and objectives of the present invention.

The algorithm 18 includes a data compression unit 20 which is configured to generate compact functions describing the sprinkler spray based on the measurement data as will be detailed in further paragraphs.

The algorithm 18 includes a near-field spray characteristics block 22 which, based on the measurement data, calculates the characteristics of the spray to provide its full description.

In the data compression unit 20, a calculation spray coefficients block 24 is coupled to the near-field spray characteristics unit 22 to calculate coefficients needed to generate compact basis functions for describing the spray, as will be presented in further paragraphs.

The logic 18 of the present invention further includes a block 26 generating analytical functions describing the spray in which the compact basis functions for describing the spray are generated based on the coefficients supplied from block 24.

A spray modeling unit 28 constitutes a portion of the data compression unit 20 and is configured to characterize the spray in terms of the compact basis functions generated in block 26 to create a product (sprinkler) database in block 30.

The basis compact functions generated in block 26 are used to provide a compact physics based representation of the spray that is well suited for initializing the spray in computer simulations performed in block 28. The compact basis functions may be generated for specific fire suppression devices in order to create the product database in block 30. The database in block 30 may be incorporated into fire suppression system design software 32 in order that a designer would need no specific knowledge on a fire suppression device beyond the device name. The product database, as it is known to those skilled in the art, is a database of all data pertaining to a product, i.e., sprinkler, including technical specifications of the product, specifications for manufacture and development, types of materials that are required to produce the product, etc.

The measurement analysis software package, i.e., algorithm 18, used in the present invention, has been developed to facilitate post-processing of the millions of drop measurements required to characterize the spray in terms of the basis compact functions. The algorithm 18 (as well as the associated measurements) are important to the development of the product database in block 30.

The subject reduced physics droplet tracking method accounting for drag forces is capable of accurately predicting the dispersion of the fire suppression spray (after initiation described with basis functions and the product database) thereby greatly reducing the computation requirements for spray dispersion analysis. The reduced physics modeling approach can be incorporated into a game engine to develop fire suppression system design software for interactive real-time graphics based design and evaluation. Using interactive design software, the fire suppression system may be evaluated based on the volume flux measurements of water under quiescent conditions consistent with regulatory code requirements (NFPA 13) and fire protection engineering practices. NFPA 13 addresses automatic fire sprinkler systems design approaches, system installation, and component options to prevent fire death and property loss. A number of interactive fire suppression systems design software are available in the industry. They are known to those skilled in the art, and are not discussed herein in detail.

Figure 2A:
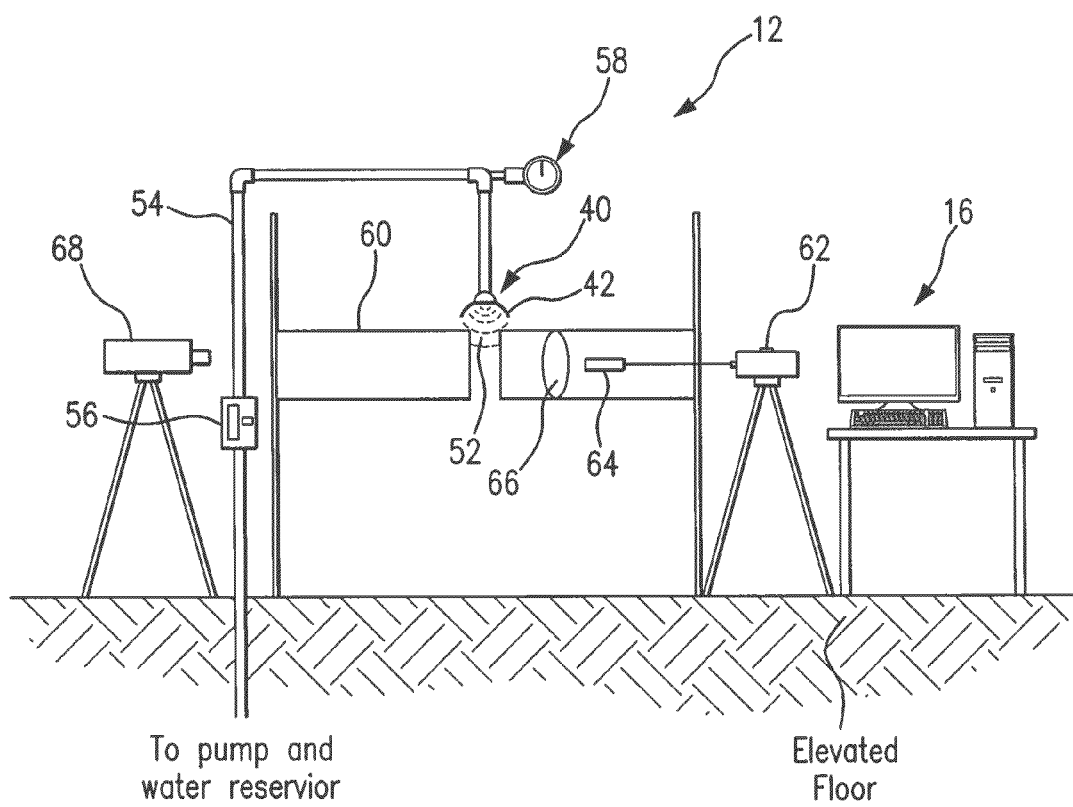
FIG. 2A is a schematic representation of the measurement sub-system of the present invention.
Figure 2B:
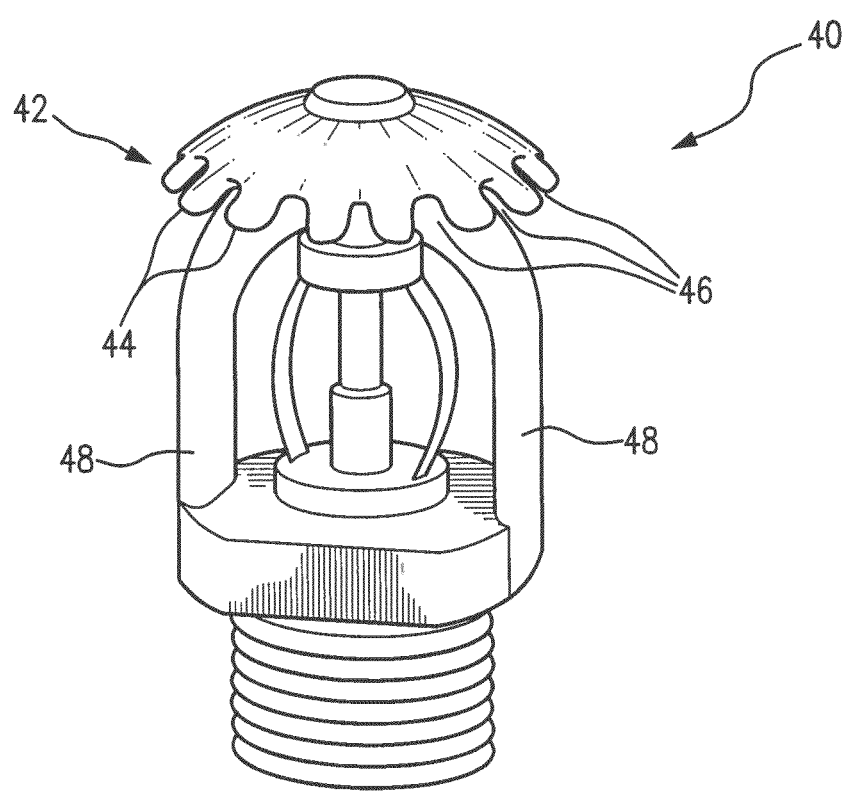
FIG. 2B is a schematic representation of the sprinkler equipped with a deflector in the measurement sub-system.

Referring to FIGS. 2A and 2B, the measurement sub-system 12 includes a sprinkler 40 under study. The sprinkler 40 is equipped with a sprinkler deflector 42 which has a plurality of tines 44 and spaces 46 and a frame, i.e. two frame arms 48, which provide the structural component which holds the sprinkler together and support the deflector during discharge.

As shown in FIGS. 2A-2B, the sprinkler (also referred to herein as a nozzle) 40 forms a spray 52 of a liquid, for example water. A water supply pipe 54 is connected to the sprinkler 40 at the base of the frame 48 to be supplied with water from a water reservoir with the help of a pump (not shown). A flow meter 56 and pressure transducer 58 are provided for operation conditions measurements. Acrylic splash guards 60 are provided to prevent the fluid dispersion beyond a specific area to prevent exposure of equipment to water.

A laser 62 and a digital camera 64 are used in measurement scheme as will be presented in further paragraphs.

In experiments, several designs of sprinklers were used in measurements for example, an ESFR pendent sprinkler with K-factor of 201.5 L/(min·bar$^{1/2}$) and a Tyco D3 spray nozzle with K-factor of 80.6 L/(min·bar$^{1/2}$) were used to generate unconfined sprays 52 characterized by the subject methodology.

The deflector in the ESFR sprinkler has 10 tine and space pairs. The Tyco D3 deflector has 12 tine and space pairs.

It should be noted that the spray was characterized at azimuthal stations (areas) bisecting the two frame arms 48 where the effect of 'shadowing' may be neglected. The effect of frame arm 'shadowing' on the initial spray and dispersion characteristics was not considered in the subject measurements.

Referring again to FIGS. 1, and 2A-2B, the drop size and velocity distribution were measured outside the sheet breakup region (defined by the guard 60) using a combined laser-supported Shadowgraphy and Particle Tracking Velocimetry (PTV) system 12 developed by LaVision GmbH schematically shown in FIG. 1. This system measures individual drop sizes and velocities simultaneously with a lower drop size limit of approximately 0.2 mm. The radial distribution of the volume flux was also measured with a mechanical patternator placed 1 m below each sprinkler 40 under study. The principles of Shadowgraphy/PTV and mechanical patternator are known to those skilled in the art, and are not presented in detail herein.

For the measurements of the initial drop size and velocity, a dual-cavity frequency doubled Nd:Yag laser 62 was used to produce 30 mJ/pulse of 532 nm light. The beam was directed though a 50 mm diffuser 64 and expanded to approximately 200 mm with a beam expander 66.

A 4 MP digital camera 68 fitted with a 50 mm Canon f/1.4 lens was aimed at the illumination field and focused approximately 100 mm in front of the Fresnel lens producing a 150 mm square field of view with a depth of field of approximately 28 mm.

The sprinkler spray 52 was directed in front of the illumination field and through the camera's imaging region partially blocking the light received by the camera 68 and producing distinct shadow images of drops. The pulsed laser 62 and camera 68 were synchronized to provide double images of the drops separated by a short time interval (~60 μs).

Spatial calibration and image-processing were applied to provide the drop sizes in each image. The drop velocities were determined through comparison of drop trajectories obtained from image pairs and the image pair separation time. Two hundred image pairs were obtained providing hundreds of thousands of simultaneous drop sizes and velocities at a given imaging station (i.e. 150×150×28 mm imaging region).

The sprinkler 40 was traversed and rotated to sweep out a large spherical interrogation region (from multiple imaging stations) extending radially between approximately 100 mm and 400 mm. These imaging stations (areas) were azimuthally aligned with the tine 44 and space 46 features of the deflector 42. The measurement regions were rotated about the axis of the sprinkler assuming rotational symmetry and neglecting frame arm effects to visualize the sprinkler spray.

The results of measurements were entered into the computer system 16 for further processing in accordance with the specifics shown in FIG. 1.

Figure 3:
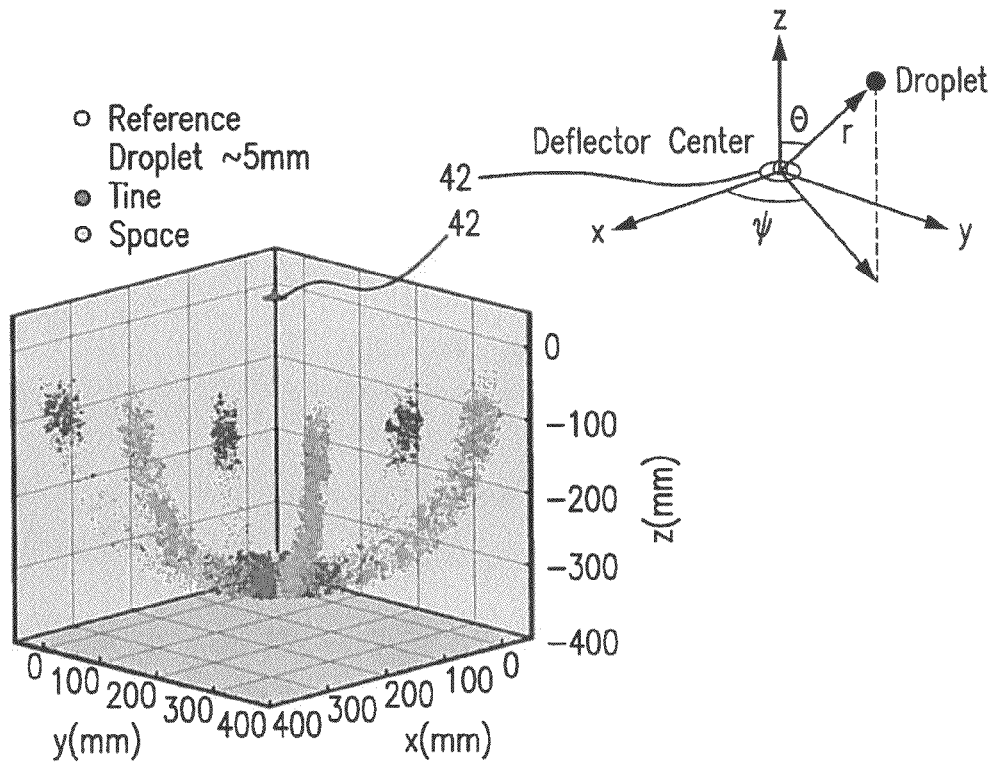
FIG. 3 is a diagram depicting a spray cloud measured for Tyco ESFR Sprinkler at 1.4 bar.

FIG. 3 shows a reconstructed 3-D spherical view of the sprinkler spray based on the shadowgraphy measurements. After individual images and imaging stations are combined, the shadowgraphy measurements produced almost one million drop measurements at each test condition, providing a large sample for reliable statistics.

Volume Density

Radial volume density distributions were obtained using a 6 m long mechanical patternator positioned 1 m below the sprinkler deflector and aligned azimuthally with the distinct tine and space features of the deflector. A characteristic dispersion length scale, R, first introduced by Prahl and Wendt in [J. M. Prahl, et al., Fire Safety J. 14 (1988) 101-111], was employed to facilitate analysis of the measurements. This reference quantity provides a maximum radial location that the spray can reach without air friction, and is given by $$R = U(2h/g)^{1/2},\quad\text{(Eq. 18)}$$

where h is the measurement elevation below the nozzle (i.e. 1 m), g is the gravitational constant, and U is the maximum initial spray velocity.

The resulting volume density distributions in the r'=r/R coordinate describe the relative effect of drag on dispersion. The dimensionless linear density of dispersed volume flow, q', is given by $$q' = \frac{q''}{Q/\pi R^2}(2r'),\quad\text{(Eq. 19)}$$

where q" is the area volume density and Q is the nozzle flow rate. The linear density provides a measure of volume flux weighted by the radius taking into consideration that more volume is captured by the larger area as the radius is increased.

Spray Initiation

These critical quantities for spray initiation are available from stochastic analysis of the measurements. It is daunting to consider the task of characterizing these sprays by tabulating measurements from individual sprinklers at every operating condition. However, a detailed analysis of the measurements reveals that a more compact representation of the initial spray is possible.

The computer system 16 of the present invention is provided with Data Compression sub-routine 20 depicted in FIG. 1 for compressed formulation which facilitates generalization over changes in operating conditions and nozzle geometries.

The initial sprinkler spray may be completely characterized in terms of the following critical quantities: drop location (radius, elevation angle, azimuthal angle), drop velocity, drop diameter, and drop density available from stochastic analysis of the measurements acquired in measurement sub-system. Although a formidable task, initialization tables for these quantities can be generated for individual sprinklers at various operating conditions. However, a more compact representation of the initial spray attained in the subject system and method provides the framework for generalized characterization over a range of operating conditions and sprinklers (nozzle) geometries. In this compact representation, only a few physically coherent parameters are required, with empirical data potentially enabling approximation of spray details even when comprehensive measurements are not available.

Since sprinkler sprays demonstrate highly stochastic behavior, the spray may be generated by specifying a number of individual drops determined from stochastic distributions based on experimental measurements of these quantities. As shown in FIG. 3, each initial drop is given four properties on a unit sphere, which include azimuthal angle ψ, elevation angle θ, dimensionless drop size d, and a dimensionless drop velocity, u. The droplets are generated on the surface of a sphere originating from the center of the deflector with radius equal to the initiation distance (typically about 0.35 m to complete spray formation). Analysis of the measurements reveals that drops move radially outward from this origin (i.e. velocity angle determined from position angle) so that only the velocity magnitude requires independent consideration. The spray may completely described in terms of the volume probability density based on solid angle:

$$\int_\theta \int_\psi \int_u \int_d f_V(\theta,\psi,u,d)d\theta\cdot d\psi\cdot du\cdot dd = 1 \quad\text{(Eq. 20)}$$

where the integral represents the complete collection of unique drops accounting for the entire spray volume. The azimuthal angle, ψ, for a drop is determined by randomly choosing an outcome space ranging between 0 and 1, and selecting the corresponding ψ according to the cumulative distribution function:

$$F_V(\psi')=\int_0^{\psi'} f_V(\psi)d\psi,\quad\text{(Eq. 21)}$$

where $f_V(\psi)$ represents the volume probability density in ψ integrated over all elevation angles, drops and velocities described by:

$$f_V(\psi)=\int_\theta \int_u \int_d f_V(\theta,\psi,u,d)d\theta\cdot du\cdot dd.\quad\text{(Eq. 22)}$$

Similarly θ is specified through random selection from the outcome space (ranging between 0 and 1) of the conditional probability cumulative distribution function $$F_V(\theta|\psi')=\int_0^\theta f_V(\theta|\psi')d\theta,\quad\text{(Eq. 23)}$$

where $f_V(\theta/\psi')$ represents the conditional volume probability density in θ at a specific azimuthal station ψ' given by:

$$f_V(\theta|\psi') = \frac{\int_u \int_d f_V(\theta,\psi',u,d)du\cdot dd}{\int_\theta \int_u \int_d f_V(\theta,\psi',u,d)d\theta\cdot du\cdot dd}.\quad\text{(Eq. 24)}$$

The local drop size distribution is given by the Cumulative Volume Fraction (CVF), which is $$F_V(d|\theta',\psi')=CVF(d)=\int_0^d f_V(d|\theta',\psi')dd.\quad\text{(Eq. 25)}$$

The local drop velocity is given by:

$$F_V(u|\theta',\psi',d')=\int_0^u f_V(u|\theta',\psi',d')du.\quad\text{(Eq. 26)}$$

Using the methods described in previous paragraphs, these cumulative functions are employed to determine the size and velocity of a random drop after the location has been assigned.

Although unwieldy, the four dimensional probability density, $f_V(\theta,\psi,u,d)$, is available from the nearly one million drop size realizations at each test condition. However, more tractable compressed forms of the important conditional probabilities required for spray generation (i.e. Eqs. 21, 23, 25, and 26) have been formulated to gain insight into the spray characteristics and to facilitate CFD (Computational Fluid Dynamics) integration.

The spray characteristics vary azimuthally because of the periodic tine and space geometry of the sprinkler deflector. These distinct spray characteristics were measured separately. Fourier series were used in block 26 to create a continuous interpolating function between adjacent space and tine measurements. For example, the continuous interpolated cumulative distribution function for assigning azimuthal location (and corresponding number density) can be generated from:

$$F_V(\psi) = A(\psi) F_V(\psi_{Tine}) + (1 - A(\psi)) F_V(\psi_{Space}), \quad \text{(Eq. 27)}$$

and $$A(\psi) = \frac{a_0}{2} + \sum_{n=1}^{\infty} a_n \cos \frac{n\pi}{T/2} \psi, \quad \text{(Eq. 28)}$$

where T is the angle sum of one tine and one space, $a_0$ and $a_n$ are Fourier coefficients for a square wave determined from the deflector geometry by integrating over the first tine ($\psi=0°$) defined in block 24 as:

$$a_n = \frac{2}{T} \int_{-T_{tine}/2}^{T_{tine}/2} \cos \frac{n\pi}{T/2} \psi \, d\psi. \quad \text{(Eq. 29)}$$

Typically, three coefficients calculated in block 24 provide a good azimuthal approximation of the measured data. For determining the elevation angle locations, $f_V(\theta|\psi')$ the volume probability density in $\theta$ at an azimuthal station $\psi'$ is first curve-fit with a Gaussian distribution to capture the typical local peak in the elevation flux profile created by the tine stream.

After subtracting this characteristic from the measured data, Legendre polynomial functions are used to curve-fit the remainder. The continuous interpolated cumulative distribution function for locating the elevation angle of random drops (and corresponding density) is given by:

$$f_V(\theta|\psi') = \frac{f_0}{\sqrt{2\pi}\,\sigma} \exp\left( \frac{(\theta - \theta_0)^2}{2\sigma^2} \right) + \sum_{n=0}^{\infty} C_n(\theta) P_n(\cos(\theta)), \quad \text{(Eq. 30)}$$

where $f_0$ is the magnitude of the local volume flux peak, $\theta_0$ is the elevation angle location of the peak (i.e. a characteristic initial trajectory angle), a characterizes the width of the local peak, $P_n$ are the Legendre polynomials, and $C_n$ are the Legendre polynomial coefficients determined from the experimental data.

Continuous (basis) functions for local drop size distribution are created by first generating continuous functions describing the local characteristic drop size, $d_{v50}$, and distribution width parameter, $\gamma$, using Legendre polynomials defined as:

$$f(d_{v50}|\theta', \psi') = \sum_{n=0}^{\infty} C_n(d_{v50}) P_n(\cos(\theta')) \quad \text{(Eq. 31)}$$

and $$f(\gamma|\theta', \psi') = \sum_{n=0}^{\infty} C_n(\gamma) P_n(\cos(\theta')), \quad \text{(Eq. 32)}$$

Local drop size distributions are generated from these parameters using a combined Log-Normal Rosin-Rammler function:

$$CVF(d) = \quad \text{(Eq. 33)}$$

$$\begin{cases} \frac{1}{\sqrt{2\pi}} \int_0^d \frac{\gamma/1.15}{d} \exp\left(-\frac{(\ln(d/d_{v50}))^2}{2(1.15/\gamma)^2}\right) dd & (d < d_{v50}) \\ 1 - \exp(-0.693(d/d_{v50})^\gamma) & (d > d_{v50}). \end{cases}$$

first suggested by FM Global [H. Z. Yu, "Investigation of Spray Patterns of Selected Sprinklers with the FMRC Drop Size Measuring System," First International Symposium on Fire Safety Science, New York, pp. 1165-1176].

Local velocity characteristics can also be described with the continuous function generated in block 26. No provision has been included in the current modeling approach to generate local velocity distributions or to generate a local drop size/velocity correlation. This correlation will undoubtedly occur during dispersion due to drag effects. However, it is not clear that a strong drop size/velocity correlation should appear in the near-field (i.e. at spray initiation).

TABLE 1

Spray initiation parameters.

| Flux/ Location | | | | | Elevation Direction, 0 | | | | |
|---|---|---|---|---|---|---|---|---|---|
| | | | | | Gaussian | | | Legendre Polynomials Avg | Legendre Polynomials Shape |
| d | $d_{v50}$ | Azimuthal Direction, ψ | Fourier Series $\alpha_0, \alpha_n$ - Deflector Geometry | Tine | $f_0$ | $\theta_0$ | σ | $C_0$ | $C_n/C_0$ |
| | | | | Space | $f_0$ | $\theta_0$ | σ | $C_0$ | $C_n/C_0$ |
| | | | | Tine | | | | $C_0$ | $C_n/C_0$ |
| | γ | | | Space | | | | $C_0$ | $C_n/C_0$ |
| | | | | Tine | | | | $C_0$ | $C_n/C_0$ |
| | | | | Space | | | | $C_0$ | $C_n/C_0$ |
| | | | | Tine | | | | $C_0$ | $C_n/C_0$ |
| ν | | | | Space | | | | $C_0$ | $C_n/C_0$ |

Table 1 summarizes the compression methodology introduced in the previous paragraphs where the measured volume flux distributions, drop size distributions, and velocity distributions (all azimuthally aligned with the space and tine deflector features) are used to generate analytical functions describing the spatial variation of the drop density, size, and velocity with elevation angle. These Legendre polynomials and Gaussian basis compact functions are defined through a series of coefficients determined from the detailed measurements. These coefficients provide average values and profile shapes for their respective spray characteristics.

Table 1 also illustrates the treatment of the azimuthal variation of the spray characteristics using Fourier series with coefficients determined from the nozzle geometry. Transforming the complex stochastic spray into this compact physically accessible framework provides insight into the essential spray features and facilitates quantitative comparisons between sprinklers.

Figure 4:
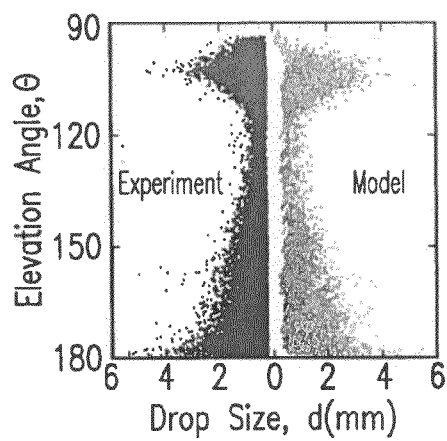
FIG. 4 depicts a scattered plot comparison between measured characterization and modeled characterization of the spray at $\psi=0°$ for Tyco ESFR sprinkler at 1.4 bar.

A drop size scatter plot over all elevation angles at an azimuthal location aligned with the tine ($\psi=0°$) is provided in FIG. 4. The scatter plot compares (block 63 depicted in FIG. 1) the measured spray data (block 22 depicted in FIG. 1) and spray data generated from the compressed spray description (block 28 depicted in FIG. 1).

As may be seen from FIG. 4, the analytical expressions formulated in blocks 24, 26, 28 are capable of generating a spray with details remarkably close to the measurements. This excellent agreement was obtained with n=10 for flux and drop size. However, n as low as 5 also demonstrates a sufficient agreement. The analytical expressions generated in block 26 based on coefficients calculated in block 24 (as depicted in FIG. 1) also help to quantify the spray characteristics through their parameters.

For example, at the tine location of $\psi=0°$, the spray parameters, $\theta_0=110°$, and $\sigma=15°$ and $q_0^*=q_0{}^n/q_{avg}{}^n=8$ describe the spray angle (i.e. peak location), peak width, and peak flux normalized by the average flux at the initiation radius.

Generating in block 28 the spray with the compact analytical expressions calculated in blocks 24, 26, provides a unique insight into the structure of the spray.

The system of the present invention is equipped with a mapping unit 50 configured to map the near-field spray characteristics in a spherical coordinate system consistent with the kinematics of the initial spray. FIGS. 5A-5C show flux and droplet size characteristics for a Tyco ESFR sprinkler at injection pressure of 1.4 bar. FIGS. 5D-5E show flux and drop size characteristics for a Tyco D3 sprinkler at 2.8 bar. The sprinkler is positioned in the center of the unit sphere. The strong variations in flux about the sphere owing to the tine and space geometry are immediately evident. The space stream produces a relatively uniform flux with elevation angle, while the tine stream produces a relatively uniform flux azimuthally. The flux quantity, q*, describes the local flux normalized by the average flux over the entire unit sphere (i.e. spray initiation radius). Even with this sprinkler geometry optimized to distribute the flow, local fluxes azimuthally aligned with the space and at elevation angles close to the deflector, may be over 10 times that of the average flux. FIGS. 5B-5C reveal that larger drops are generated from the tine streams at elevation angles close to the deflector than from the space streams although the width of the local drop size distributions described by gamma is relatively uniform over the unit sphere.

To evaluate the compression scheme further, flux measurements 1 m below the deflector were compared with dispersion predictions initiated with the compressed spray description. The analytical spray was generated in a quiescent air environment and tracked from the initiation location using a Lagrangian particle tracking approach.

However, not every drop in the spray is tracked in this approach. Instead, each drop has a coefficient representing a collection of drops with similar properties (i.e. location, drop size, velocity). The coefficient is adjusted to conserve the volumetric flow rate.

In each time step $\Delta t$, for a group of N drops generated and introduced into the spray at the initiation location, the coefficient of each drop is given by:

$$C_N = \frac{Q \cdot \Delta t}{N \cdot \rho^{\pi}/6 d_N^3}. \tag{Eq. 34}$$

Drag equations were included to provide one way coupling between the quiescent air and the spray, described by:

$$\frac{d\vec{u_d}}{dt} = \vec{g} - \frac{3}{4}\frac{\rho_g}{\rho_d}\frac{C_d}{d}(\vec{u_d} - \vec{u_g})|\vec{u_d} \to \vec{u_g}|. \tag{Eq. 35}$$

where $C_d$ is the drag coefficient, $\rho_g$ is gas density, $\rho_d$ is drop density, $u_g$ is gas velocity, $u_d$ is drop velocity. The simplifying assumption of one way coupling is expected to be valid in this momentum dominated region of the spray.

To further simplify the spray description, only the zeroth order Legendre polynomial was used to describe the velocity (i.e. average spray velocity). Although higher order descriptions of the spray would capture spatial variations in velocity, the simplifying assumption of a single characteristic velocity at initiation was explored.

Figure 6A:
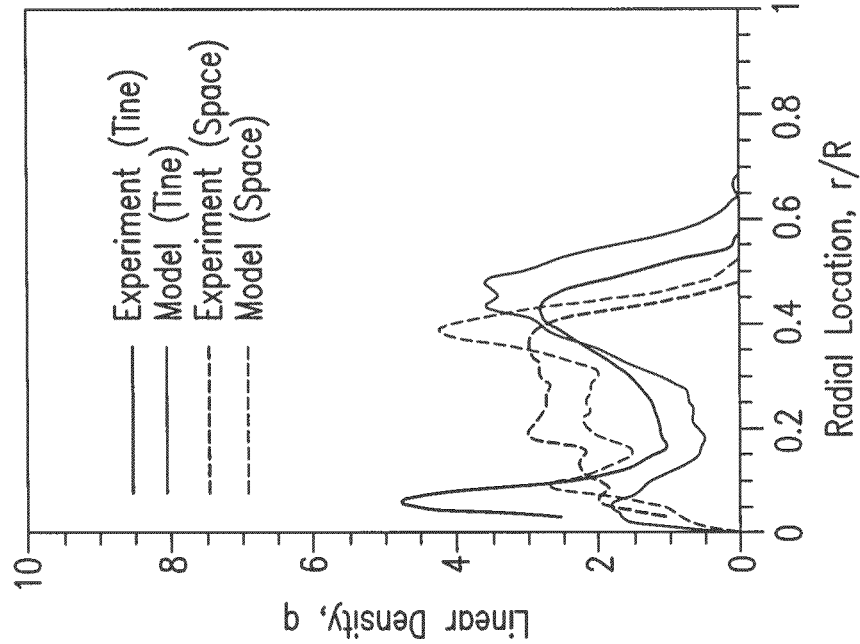
FIGS. 6A-6B depict diagrams representative of linear density vs. radial location for Tyco ESFR sprinkler and Tyco D3 sprinkler, respectively.

Comparisons performed in block 63 depicted in FIG. 1 between the predicted (blocks 26-28) and measured (block 22) flux distribution are provided in FIG. 6A. The linear density of volumetric flux shows excellent agreement between the predicted and measured fluxes 1 m below the nozzle revealing not only the accuracy of the compression approach, but also the suitability of the simplified air-drop coupling for particle tracking near the nozzle exit. However more careful coupling may be required further away from the sprinkler.

It is interesting to compare spray characteristics between sprinklers in FIGS. 5A-5F and FIGS. 6A-6B. Strong similarities are observed in the shape functions between the large Tyco ESFR sprinkler and the much smaller Tyco D3 nozzle in FIGS. 5A-5C vs. FIGS. 5D-5E, FIG. 5A vs. FIG. 5D, FIG. 5B vs. FIG. 5E, as well as FIG. 5C vs. FIG. 5F. Despite their very different sizes and geometries, both nozzles possess distinct tine and space spray features. The ESFR sprinkler directs more flow downward while the D3 nozzle has higher fluxes near the 'equator'. It should also be noted that the larger values of vindicate that the drop size distribution is narrower for the D3 nozzle.

Figure 6B:
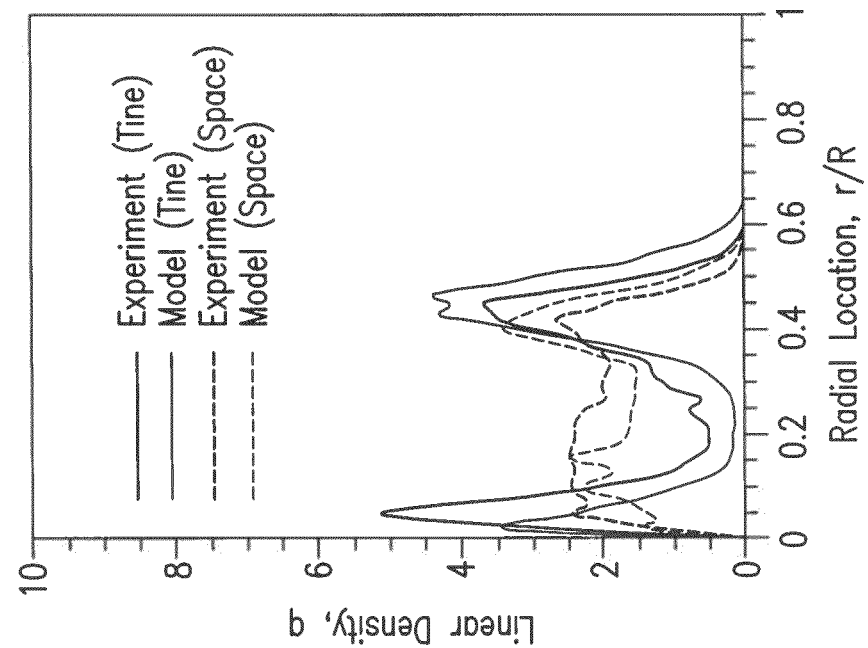

FIG. 6A-6B show that these similar shape functions at spray initiation produce similar flux profiles 1 m below the nozzle with uniform and double peaked linear densities aligned at locations azimuthally aligned with the spaces and tines, respectively.

The detailed initial spray measurements performed in the subject methodology reveal the strong relationship between the sprinkler geometry and the resulting spray pattern. The measured volume flux and drop size distributions demonstrate strong directional dependence with azimuthal ($\psi$) and elevation ($\theta$) angles. Correct specification of these quantities is essential for accurate prediction of spray dispersion and volume density distribution at the floor.

The unique framework established in the present system is devised to compress the extensive initial spray data using compact analytical functions capable of high-fidelity spray generation for CFD integration. The compact formulation of the initial spray is capable of generating sprays, which closely resembles the measurements.

Furthermore, dispersion predictions initiated with the analytical functions agree well with volume density measurements obtained 1 m below the sprinklers providing additional validation of both the compact initial spray formulation and detailed spray measurements.

The compact analytical functions reveal strong similarities between initial spray characteristics for different sprinkler geometries. Establishing a sprinkler database within this framework may provide further insight to quantify typical features of these sprays and thus help to remove the widespread uncertainty associated with specifying the initial sprinkler spray in CFD analysis.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is being claimed is:

1. A method for evaluating a fire suppression system performance, comprising the steps of:
   (a) measuring near-field characteristics of an initial spray generated by a sprinkler under study equipped with a sprinkler deflector, said characteristics being measured in vicinity of the sprinkler discharge at various operating conditions and different geometries of the sprinkler deflector, said near-field characteristics including 3-dimensional characterization of volume flux distributions, drops' size distributions, and drops' velocity distributions in said initial spray azimuthally correlated with geometric features of said sprinkler deflector;
   (b) entering said measured characteristics of the initial spray in a computer system configured to process said measured characteristics in accordance to a measurement analysis algorithm,
   specifying said initial spray by a number of individual drops determined based on the measured characteristics attained in said step (a), wherein said number of drops is generated on a surface of a sphere originated from a center of said sprinkler deflector with a radius equal to an initiation distance for complete spray formation,
   assigning azimuthal angle $\psi$, elevation angle $\theta$, dimensionless drop size d, and dimensionless drop velocity V to each of said number of individual drops, and
   describing the initial spray in terms of the volume probability density as $\int_\theta \int_\psi \int_u \int_d f_V(\theta, \psi, u, d) d\theta \cdot d\psi \cdot du \cdot dd = 1$, where the azimuthal angle $\psi$ is determined by randomly choosing an outcome space ranging from 0 to 1, and selected according to the cumulative distribution function:

$F_V(\psi') = \int_0^{\psi'} f_V(\psi) d\psi$, where $f_V(\psi)$ represents the volume probability density for $\psi$ integrated over elevations angles $\theta$, drops sizes, and drops velocities in:

$f_V(\psi) = \int_\theta \int_u \int_d f_V(\theta, \psi, u, d) d\theta \cdot du \cdot dd$; and (c) transforming said 3-dimensional characterization of said initial spray into a compact representation thereof through the steps of:
   generating analytical functions describing spatial variation of said drops' density, size, and velocity in correspondence to an elevation angle, wherein said analytical functions include Legendre polynomials, Gaussian functions, and Fourier series, each defined through respective coefficients determined by processing said measured near-field characteristics, wherein said respective coefficients provide average values and profile shapes for said measured spray characteristics, for said Legendre polynomials and Gaussian functions, and wherein said respective coefficients are determined from the sprinkler's nozzle geometry for said Fourier series.

2. The method of claim 1, further comprising the step of:
   in said step (c), generating a product database for said sprinkler under study.

3. The method of claim 1, further comprising the step of:
   in said step (a), applying Shadowgraphy/PTV (Particle Tracking Velocimetry) measurements.

4. The method of claim 1, further comprising the step of:
   in said step (a), directing a pulsed laser beam onto the initial spray,
   focusing a digital camera on the initial spray,
   synchronizing the pulsed laser and the digital camera actuation to acquire double images of drops in said initial spray separated by a predetermined image separation time interval,
   applying spatial calibration and image processing to said double images of drops to result in drops' sizes in each said double image, and
   acquiring drops' velocities through comparison of drops' trajectories obtained from said double images and said image separation time interval.

5. The method of claim 1, further comprising the step of:
   in said step (b), combining individual images and said multiple imaging areas.

6. The method of claim 1, further comprising the steps of:
   in said step (a), measuring radial volume density distributions; and
   in said step (b), obtaining, in said computer system, a maximum density radial location R of said initial spray as:

$R = U(2h/g)^{1/2}$, where h is the measurement elevation below a nozzle of the sprinkler, g is a gravitational constant, and U is the maximum initial spray velocity, and
   calculating, in said computer system, a linear density of a dispersed volume flow q' as:

$q' = \frac{q''}{Q/\pi R^2}(2r')$, where q" is the area volume density, and Q is the nozzle flow rate.

7. The method of claim 1, further comprising the steps of:
   specifying the elevation angle $\theta$ through random selection from the outcome space ranging between 0 and 1 of the conditional probability cumulative distribution function:

$F_V(\theta|\psi') = \int_0^\theta f_V(\theta|\psi') d\theta$ where ($\theta/\psi'$) represents the conditional volume probability density of $\theta$ at a specific azimuthal area $\psi'$ given by:

$$f_V(\theta|\psi') = \frac{\int_u \int_d f_V(\theta, \psi', u, d) du \cdot dd}{\int_\theta \int_u \int_d f_V(\theta, \psi', u, d) d\theta \cdot du \cdot dd}.$$

8. The method of claim 2, further comprising the step of: incorporating said product database into a fire suppression system design system.

9. The method of claim 4, further comprising the steps of: in said step (a), traversing and rotating said sprinkler to form an extended spherical interrogation region covering multiple imaging areas, each azimuthally aligned with the geometry features of said sprinkler deflector.

10. The method of claim 7, further comprising the step of: in said step (c), calculating, in said computer system, a local drop size distribution as:

$$F_V(d|\theta',\psi') = CVF(d) = \int_0^d f_V(\dot{d}|\theta',\psi')d\dot{d}$$

where CVF(d) is a Cumulative Volume Fraction.

11. The method of claim 10, further comprising the step of: in said step (c) calculating, in said computer system, a local drop velocity as:

$$F_V(u|\theta',\psi',d') = \int_0^u f_V(\dot{u}|\theta',\psi',d')d\dot{u}.$$

12. The method of claim 11, further comprising the steps of:

in said step (a), measuring azimuthally variable characteristics of said initial spray and in said step (c), where said sprinkler deflector has a plurality of tines and spaces, applying Fourier series to said measured azimuthally variable characteristics to calculate a continuous interpolation function between said characteristics measured for adjacent spaces and tines, as:

$$F_V(\psi) = A(\psi)F_V(\psi_{Tine}) + (1 - A(\psi))F_V(\psi_{Space})$$

$$A(\psi) = \frac{a_0}{2} + \sum_{n=1}^{\infty} a_n \cos\frac{n\pi}{T/2}\psi$$

where T is the angle sum of an individual tine and individual space, $\alpha_o$ and $\alpha_n$ are Fourier coefficients for a square wave determined from said deflector geometry calculated for a first tine of the deflector as:

$$a_n = \frac{2}{T}\int_{-T_{tine}/2}^{T_{tine}/2} \cos\frac{n\pi}{T/2}\psi d\psi.$$

13. The method of claim 12, further comprising the steps of:

in said step (c), determining the elevation angle locations of random drops in said initial spray as:

$$f_V(\theta|\psi') = \frac{f_0}{\sqrt{2\pi}\,\sigma}\exp\left(\frac{(\theta-\theta_0)^2}{2\sigma^2}\right) + \sum_{n=0}^{\infty} C_n(\theta)P_n(\cos(\theta)),$$

where $f_o$ is a magnitude of the local volume flux peak, $\theta_0$ is an elevation angle location of the local volume flux peak, $\sigma$ characterizes a width of the local volume flux peak, $P_n$ are the Legendre polynomial coefficients determined from the measurements performed in said step (a).

14. The method of claim 13, further comprising the steps of:

wherein in said step (c), said compact basis functions describe the local characteristic drop size, $d_{v50}$, and distribution width parameter, $\gamma$, as:

$$f(d_{v50}|\theta',\psi') = \sum_{n=0}^{\infty} C_n(d_{v50})P_n(\cos(\theta')),$$

and $$f(\gamma|\theta',\psi') = \sum_{n=0}^{\infty} C_n(\gamma)P_n(\cos(\theta'))$$

wherein local drop size distributions are generated from said $d_{v50}$ and $\gamma$ by applying a combined Log-Norman-Rosin-Ramnler function:

$$CVF(d) = \begin{cases} \frac{1}{\sqrt{2\pi}}\int_0^d \frac{\gamma/1.15}{\dot{d}}\exp\left(-\frac{(\ln(\dot{d}/d_{v50}))^2}{2(1.15/\gamma)^2}\right)d\dot{d} & (d < d_{v50}) \\ 1 - \exp(-0.693(d/d_{v50})^\gamma) & (d > d_{v50}). \end{cases}$$

\* \* \* \* \*